Nov. 22, 1955  R. S. KOFFORD  2,724,402
SELF-FILLING POULTRY DRINKING CUP
Filed Nov. 22, 1952
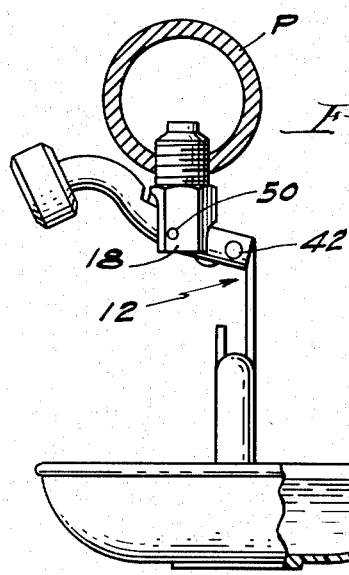
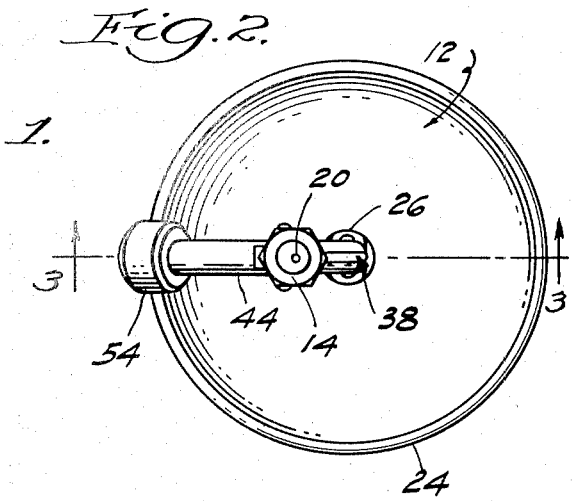
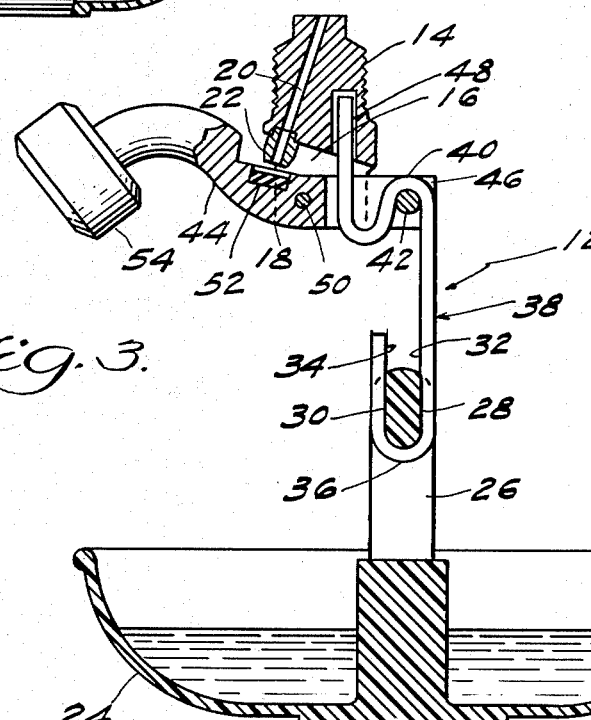
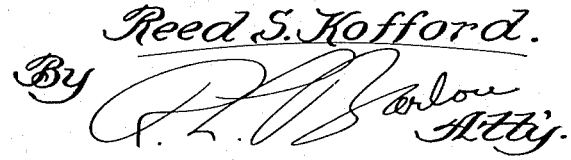
Inventor:
Reed S. Kofford.

2,724,402
SELF-FILLING POULTRY DRINKING CUP

Reed S. Kofford, Van Nuys, Calif.

Application November 22, 1952, Serial No. 321,997

8 Claims. (Cl. 137—408)

This invention relates to improvements in animal drinking equipment and particularly to a drinking cup for poultry.

An object of this invention is to provide a drinking cup for poultry with means suspending the cup in such arrangement that when the cup is empty or partially empty, a valve is opened causing water to flow into the cup, and when the cup becomes full, the weight of the cup with its contents exerts a force on the valve closing the valve.

Another object of the invention is to provide a mechanically simple and practical automatically filling poultry cup in that the cup is easily separated from its support for cleaning, and the entire structure is disassembled by removal of a single pin so that the valve may be periodically cleaned.

A further object of the invention is to provide an improved poultry drinking device by having the cup separably connected with its support, but arranging the connection in such a way that the cup will not wobble with respect to its support and the support will always keep the cup erect during poultry drinking.

Other objects and features will become apparent in following the description of the illustrated form of the invention. In the drawing:

Figure 1 is an elevational view of the poultry drinking device in the closed condition, a portion of the cup being shown in section to indicate that the liquid level in the cup is reasonably high when the valve is closed;

Figure 2 is a plan view of the device of Figure 1, the water supply pipe being omitted;

Figure 3 is an enlarged sectional view taken on the line 3—3 of Figure 2 and in the direction of the arrows, showing particularly the low water level in the cup and the consequence thereof, namely the open position of the valve to refill the cup.

In the accompanying drawing there is a conventional water supply pipe P showing one suggested connection of the device with a source of water, various alternatives being apparent. The automatic filling poultry drinking device 12 includes a liquid outlet member 14, as the plug of Figure 3, which may be externally threaded to conveniently connect with supply pipe P. The lower end of member 14 is provided with a slot 16 thereby leaving carrying brackets 18 on each side thereof. A longitudinal passage 20 opens through the upper end of outlet member 14 and through the base of slot 16 in the bottom of member 14, the upper end of passage 20 being exposed to the liquid under pressure in pipe P, while the lower end has a valve seat 22 connected with it.

A suitable cupped receptacle, for example of plastic or other material 24 contains water from pipe P and the poultry drink therefrom. Cup 24 has a cross connecting handle element 26 that rises above the drinking level of the cup and there are flat side surfaces 28 and 30 on the handle bar that cooperate with parallel sides 32 and 34 of a hook 36 at the lower end of cup support 38. Because of this and the fact that hook 36 snugly fits the cross bar cup 24 will not wobble with respect to cup support 38 while the animals drink.

The upper end of support 38 is also of special construction, the support being preferably a length of wire and containing a downwardly opening bight 40 that has a pin 42 nested therein, from which support 38 hangs. Pin 42 extends across the slot between and is secured to bifurcations 46 at one end of a lever 44 and bight 40 is disposed therebetween. Thus, support 38 cannot be swung in one direction by chicks as they drink from cup 24. Moreover, the extreme upper end of support 38 extends into a downwardly opening guideway 48 formed by a recess in member 14, thereby preventing the chicks from moving cup 24 from the properly supported position and spilling water from the cup.

Lever 44 is supported below seat 22 between brackets 18 and in slot 16 by means of a single pin 50 that spans slot 16 and is removably carried in aligned apertures in brackets 18. Support 38 is connected with lever 44 on one side of pivot 50 and there is a valve element 52, as a Neoprene disc carried in a recess in lever 44 on the opposite side of pivot 50. A counterweight 54 is connected to the valve operating lever 44 on the same side of pivot 50 as the valve element.

In assembly and operation, liquid outlet member 14 is threaded or otherwise connected to a source of liquid supply. Support 38 is fastened to lever 44 by hanging its bight on pin 42 and then the cup is secured to support 38 by engaging hook 36 with handle element 26. Now, lever 44 may be assembled with member 14 by fitting the upper end of support 38 into guideway 48 and the lever in slot 16. Single pivot 50 is then inserted through the aligned apertures of brackets 18 and a suitably located aperture in lever 44.

Cup 24 being empty at this time, its weight is not sufficient to counterbalance weight 54 and therefore, lever 44 is moved to such position that valve element 52 is separated from valve seat 22, permitting liquid to flow from the valve into cup 24. As the cup fills, the combined weight of the cup and its contents increases until it is sufficient to overcome the force exerted on lever 44 by counterweight 54, at which time the lever is pivoted about pin 50 to a position where valve element 52 contacts seat 22, closing the valve. When the water is emptied by poultry drinking, the same automatic filling operation takes place.

It is understood that variations and modifications as fall within the scope of the following claims may be made without departing from the scope of protection afforded thereby.

What is claimed is:

1. In an automatically filling drinking device for poultry, a liquid outlet member having a substantially downwardly directed liquid outlet, a cup having an upstanding element provided with flat sides, a lever pivotally supported between its ends by said liquid outlet member, a cup support having surfaces at one end substantially parallel to said flat sides and in contact therewith to prevent said cup from wobbling on said support, means connecting the opposite end of said support to one end of said lever, said liquid outlet member being vertically spaced from and located above said cup, a valve element carried by said lever and cooperative with said liquid outlet to close said outlet in response to movement of said lever in one direction caused by the weight of a predetermined amount of liquid present in said cup, and a counterweight carried by said lever near the end thereof opposite to the end to which said support is connected, said counterweight overbalancing the weight of said cup when the latter is empty.

2. The drinking device of claim 1 wherein said connecting means comprises a downwardly opening bight in the support, and a pin secured to said lever and nested within said bight.

3. The drinking device of claim 2; and said outlet member having a guideway therein, and the end of said support opposite to that end which is attached to the cup being slidably disposed in said guideway, so that the latter stabilizes said cup against swinging sufficiently to spill therefrom water contained therein.

4. A self filling poultry drinking device comprising a cup accessible to poultry to drink therefrom, a water outlet member having means whereby it may be separably connected to a conventional water supply structure, said member having a lower end and a passage opening therethrough, a valve seat at the lower end of said passage, a valve element, a lever pivoted to said member at a point about which said lever swings in a vertical plane, said lever supporting said valve element in a cooperative relation to said valve seat, a support for said cup connected to said lever on one side of said pivot point thereof and having means to retain said cup below said valve seat, and a counterweight acting on said lever on the opposite side of said pivot point whereby the water that passes through said outlet member enters the cup so that the weight of the water in the cup pivotally actuates said lever to a point where the valve element on the lever contacts said valve seat, preventing further discharge of water therethrough until a predetermined amount of the water has been removed from the cup.

5. A self filling poultry drinking device comprising a cup accessible to poultry to drink therefrom, a water outlet member having means whereby it may be separably connected to a conventional water supply structure, said member having a lower end and a passage opening therethrough, a valve seat at the lower end of said passage, a valve element, a lever pivoted to said member and supporting said valve element in a cooperative relation to said valve seat, a support for said cup connected to said lever on one side of said pivot point thereof and having means to retain a cup below said valve seat, and a counterweight acting on said lever on the opposite side of said pivot point whereby the water that passes through said outlet member enters the cup so that the weight of the water in the cup pivotally actuates said lever to a point where the valve element on the lever contacts said valve seat, preventing further discharge of water therethrough until a predetermined amount of the water has been removed from the cup, and means operatively connected with said lever and said outlet member for guiding said cup support while said lever is being moved and for constraining the movement of said cup support.

6. The drinking cup device of claim 5; and said lever being connected to said outlet member solely by a single pin passing through said lever so that when said pin is removed, said lever and said support are separated from said outlet member.

7. In an automatically filling drinking device for poultry, a cup having an upwardly extending handle element, said handle element having a crossbar with flat opposite side surfaces, and a wire supporting member for said cup, said wire member having a hook shaped lower end portion which snugly fits said crossbar and engages said flat surfaces of said crossbar, said wire having above said hook portion a downwardly opening bight in it for hanging upon a weighted lever which is rockably supported to control water supply to said cup, said wire member having above its said bight an upwardly directed end portion to engage a guideway in a water supply member, thus to stabilize the position of said cup.

8. In an automatically filling drinking device for poultry, the combination, with a rockably mounted lever which forms a part of a valve controlled water supply means for poultry; of a cup having an upwardly extending handle element, said handle element having a crossbar with flat opposite side surfaces, and a wire supporting member for said cup, said wire member having a hook shaped lower end portion which snugly fits said crossbar and engages said flat surfaces of the said crossbar, said wire having above said hook portion a downwardly opening bight in it for hanging upon said lever, the latter having a bifurcated portion within which said bight is located a pin bridging said bifurcated portion and engaged by said bight, said wire having about said hook portion an upwardly directed end portion, and a water supply member mounted superjacent to said lever, said water supply member having in it a downwardly opening recess within which is loosely and removably contained said upwardly directed end portion of said wire to stabilize the position of said cup.

References Cited in the file of this patent

UNITED STATES PATENTS

| | | |
|---|---|---|
| 352,047 | Dewey | Nov. 2, 1886 |
| 450,170 | Magee | Apr. 14, 1891 |
| 1,477,227 | Meister | Dec. 11, 1923 |
| 2,632,463 | Martin | Mar. 24, 1953 |

FOREIGN PATENTS

| | | |
|---|---|---|
| 598,401 | France | 1925 |